United States Patent [19]

Sasnett

[11] 3,971,605

[45] July 27, 1976

[54] MODULAR FURNISHINGS

[75] Inventor: Russell M. Sasnett, Altamonte Springs, Fla.

[73] Assignee: Russel M. Sasnett, Louisville, Ky.

[22] Filed: Nov. 28, 1975

[21] Appl. No.: 636,026

Related U.S. Application Data

[63] Continuation of Ser. No. 435,758, Jan. 23, 1974, which is a continuation of Ser. No. 221,190, Jan. 27, 1972, abandoned.

[52] U.S. Cl................................. 312/198; 312/236; 312/223
[51] Int. Cl.²......................................... A47B 53/00
[58] Field of Search .......... 312/198, 236, 223, 107, 312/111; 240/4

[56] References Cited
UNITED STATES PATENTS

| | | | |
|---|---|---|---|
| 2,007,184 | 7/1935 | Dunning | 240/4 |
| 2,328,130 | 8/1943 | Earle | 312/236 |
| 2,539,613 | 1/1951 | Earle | 312/236 |
| 2,661,994 | 12/1953 | Knuth | 312/107 |
| 2,860,404 | 11/1958 | Alden | 312/223 |

*Primary Examiner*—Paul R. Gilliam
*Assistant Examiner*—Victor N. Sakran
*Attorney, Agent, or Firm*—Robert W. Fletcher; Francis H. Boos

[57] ABSTRACT

A plurality of prefabricated modular kitchen units are adapted for floor-to-ceiling installation along at least two intersecting kitchen walls for minimizing installation time and obviating the necessity for finishing the walls along which the units are installed.

Installation is facilitated by a corner unit construction that permits the end-wise insertion of spaced connectors for joining spaced perpendicularly related modular units to adjacent sides thereof, as in an L-shaped layout at a kitchen corner, and in the formation of cooperating recesses or cavities in the various units to house the necessary wiring and plumbing. Complete coverage of a wall along which the units are installed is assured adjacent the ceiling by an adjustable lighting module which performs the dual functions of lighting the kitchen and providing an adjustable molding between the modular units and ceiling while any variations between the wall length and installed units is compensated for by the installation of a modular panel section.

A further feature of the invention resides in so dimensioning a sink module that the same may include storage cabinets above the sink are which are both accessible and non-obstructive to the user.

1 Claim, 8 Drawing Figures

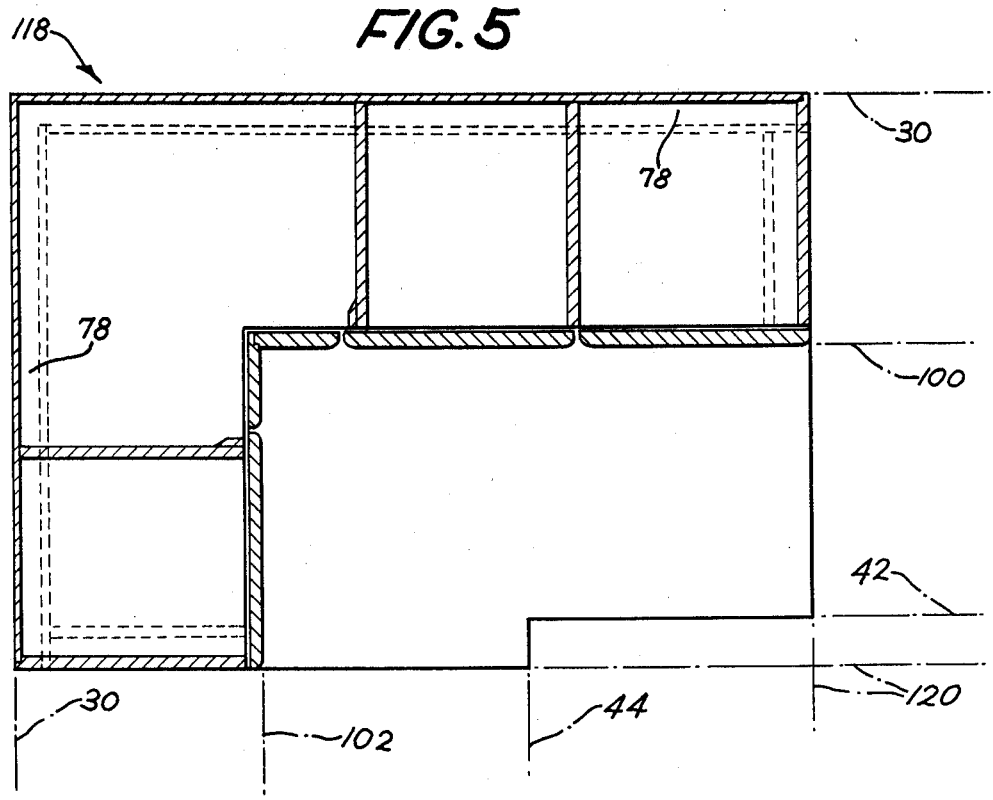
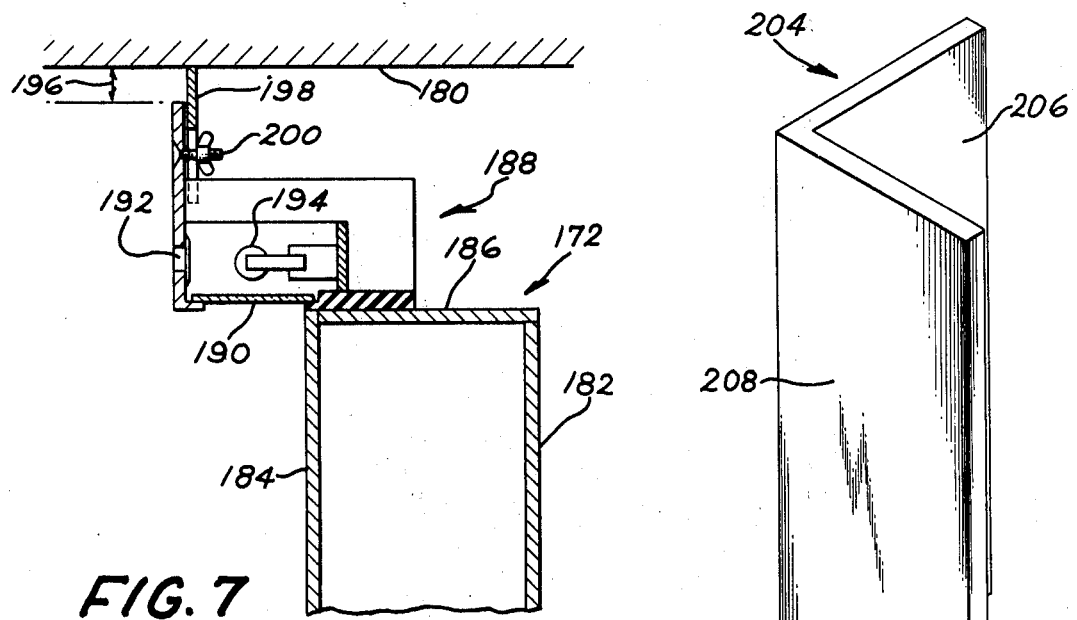
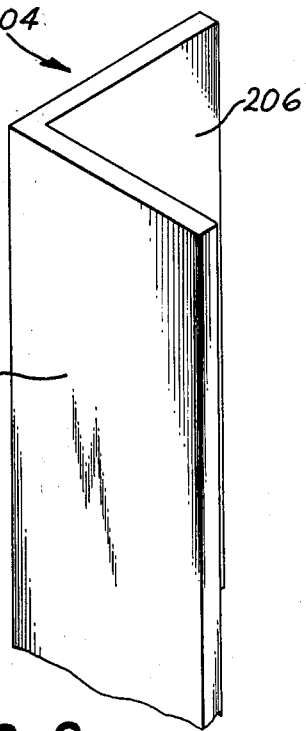

MODULAR FURNISHINGS

CROSS REFERENCE TO RELATED APPLICATIONS

This application is a continuation of U.S. Pat. application Ser. No. 435,758, for MODULAR FURNISHINGS, by Russell M. Sasnett, filed Jan. 23, 1974, which, in turn, is a continuation of U.S. Pat. application Ser. No. 221,190, for MODULAR FURNISHINGS, by Russell M. Sasnett, filed Jan. 27, 1972, now abandoned.

BACKGROUND OF THE INVENTION

The invention relates primarily to kitchen assemblies constructed from prefabricated modular units.

The great majority of home and apartment kitchen constructions proceed piecemeal in conjunction with the total construction project and the actual work done in the kitchen by the contractor and/or various subcontractors is spread over a substantial part of the elapsed project construction time. Typically, the plumbing layout and electrical wiring are done before the walls are installed, followed by wall installation and the building or installing of cabinetry or storage space. After the cabinetry is in place, the various kitchen appliances are placed in the desired locations. The plumbers then return to hook up the sink, dishwasher, disposal and the like to the previously installed drains and supply lines and the electricians return to hook up the various appliances and provide the desired receptacle outlets, switches, lighting and the like.

In one apartment construction project that was studied, the average total on-site effort to install cabinetry and appliances in a kitchen required approximately 26 man hours spread over a 3 month period. Substantial effort was required on the part of the contractor to schedule men and materials for each phase of the kitchen construction. Prototypes in accordance with this invention have been installed in apartments comparable to that mentioned above. Disregarding an initial learning period, the assembly of cabinetry and appliances at the site required approximately 2 man hours per kitchen. It is accordingly apparent that on-site construction time can be substantially reduced by using modular units to assemble a kitchen.

The desirability to constructing kitchens or other furnished rooms or living areas from prefabricated modular furnishing units has been previously recognized as exemplified by the disclosure in British Pat. No. 26,019 of 1917 which described a modular furnishing system employing modules of common height and depth and varying widths constituting a multiple of a given linear dimension. Other exemplary disclosures appear in U.S. Pat. Nos. 2,004,933; 2,660,270 and 2,901,780, in German Patent No. 812,274 and in British Patent Nos. 429,076 and 1,046,344.

One substantial problem in constructing a kitchen from modular units is the fabrication of a corner module which is compatible with the remaining modules. One desideratum of modular kitchen furnishings is that the modules be interconnected to prevent misalignment along the counter top. A typical method of interconnecting aligned modules positioned parallel to a single wall is disclosed in pending applications Ser. Nos. 158,849 and 158,850 filed July 1, 1971 and assigned to the assignee of the present invention. The connector structures disclosed therein involve, basically, the end-wise insertion of an elongated connector into a bipartite cavity formed by cooperating structure on adjacent modules. The usual corner construction involves a module having a rectangular cross-section with the lengths of adjacent sides thereof being equal to the depth of the modular component abutted thereagainst. Thus mutually perpendicularly positioned kitchen modules backing on intersecting walls adjacent the corner define, with the kitchen walls and included corner, a rectangular space into which the corner module fits to form a continuation of the countertop from one module to the other. It is thus apparent that the two modules positioned on adjacent walls abut at one corner and leave no front facing portion of the corner module exposed for the insertion of connectors between each of the perpendicularly related modules and the corner module. The desirability of using end-wise, insertible connectors between a corner unit and its adjacent units is for standardization purposes since different kitchen layouts will dictate that any of the various units be compatible with any other unit.

Several additional problems exist in providing a modular kitchen which have apparently not been appreciated by the prior art. It is desirable to provide means for quickly and conveniently installing the necessary electrical and plumbing network. This problem is resolved using a conjunction of different techniques to resolve specifically different problems, i.e., making the necessary wiring and plumbing connections from a remote location to the desired location behind the modular array and exposing the necessary electrical components to the front of the array. The first problem is resolved by providing a raceway behind the array and in front of the wall juxtaposed thereto for receiving electrical cable and pipes of various function. The second problem is resolved by forming electrical component receiving cavities between adjacent units.

An important factor as regards contractor acceptance of the modular kitchen concept herein disclosed is the fact that the wall surfaces against which the modular array is positioned are completely covered obviating the necessity for finishing the walls. As an incident of the foregoing, storage cabinet structure is integrated with the sink module at a conveniently accessible level yet positioned in such a manner as to insure adequate headroom for a person using the sink.

SUMMARY OF THE INVENTION

The invention is directed to a perpendicularly related modular furniture array for use in furnishing a living area such as a kitchen or other room in a dwelling or office, etc.

A primary purpose of the invention is to provide a corner unit construction which separates the adjacent perpendicularly related modules and has a front portion thereof exposed for the insertion of connectors between the corner module and the flanking adjacent modules. The structure just described thus defines a perpendicularly related modular furnishing unit array including first and second furnishing units fronting on perpendicular vertical planes, a corner unit between and abutting the first and second units, and means operable from a location spaced from the intersection of the planes for connecting the first and second units to the corner unit.

It is among the further objects of the invention to provide a composite raceway extending between a modular array and the associated kitchen walls for the reception of wiring and plumbing to create as an incident of the juxtaposition of two modules, an electrical outlet receiving cavity.

DESCRIPTION OF THE DRAWINGS

FIG. 5 is a horizontal cross-section similiar to FIG. 2, of a modified corner unit contruction;

FIG. 7 is a cross-sectional view of the light molding unit taken along line 7—7 of FIG. 1; and FIG. 8 is a perspective view of a finishing or spacing panel which may be used between the end of a modular unit array and a wall to close off the gap therebetween.

DESCRIPTION OF THE PREFERRED EMBODIMENT

Figure 1:
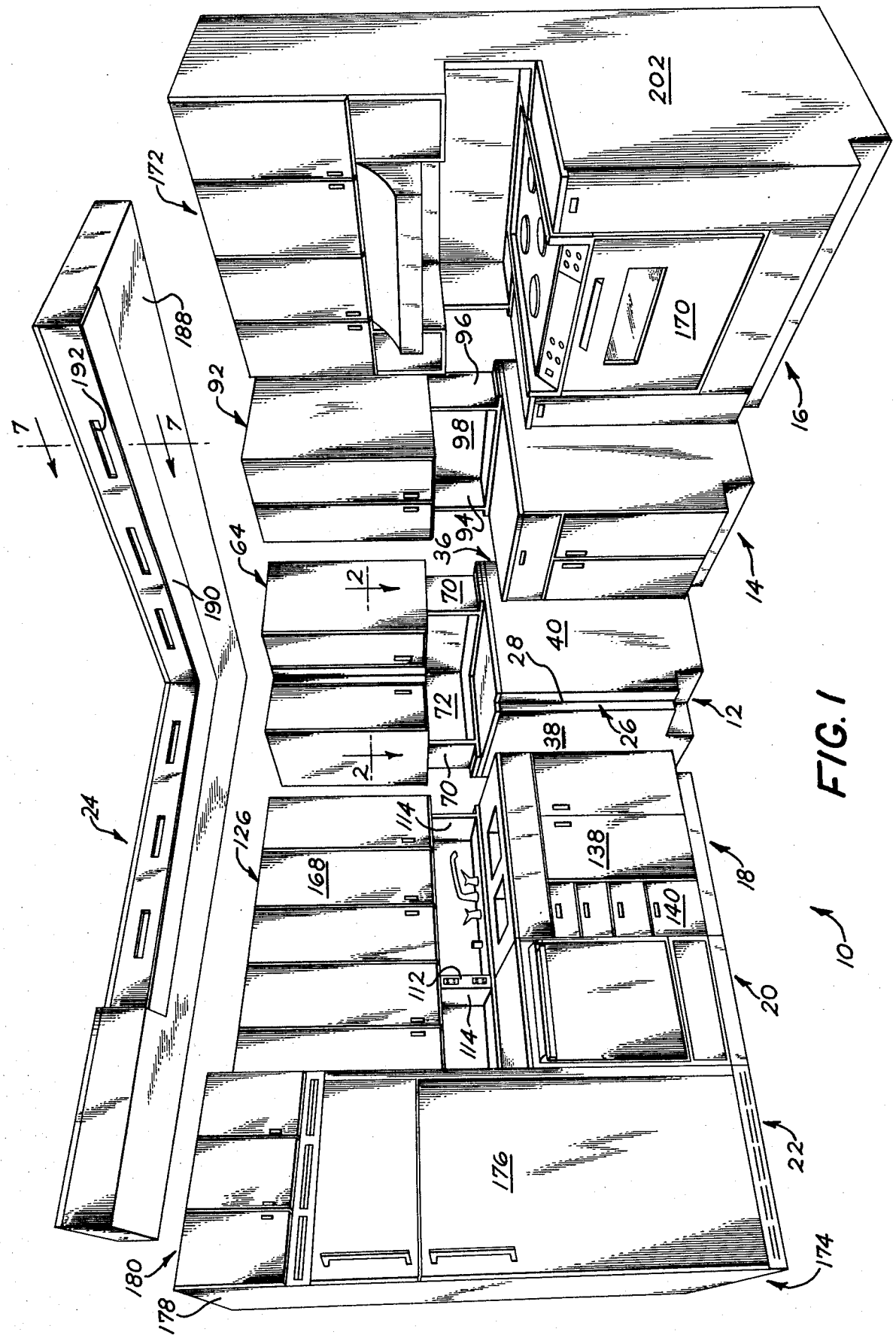
FIG. 1 is a partly assembled and partly exploded perspective view of a perpendicularly related modular kitchen array.

In FIG. 1 is illustrated a modular furnishing array 10 comprising an L-shaped kitchen design assembled from a plurality of compatible modular units including a corner module 12, a storage module 14, a range module 16, a sink module 18, a dishwasher module 20 and a refrigerator module 22. Each of the floor supported, or free standing, modules includes with the exception of the refrigerator module a lower base portion and an upper cabinet portion supported thereabove by imperforate column and panel structure so that no portion of the kitchen wall behind a module is exposed. In the case of the refrigerator module, the upper cabinet structure is supported directly over the upper surface of the refrigerator. Each of the modules are of common height calculated to approximate an average floor-to-ceiling height and any discrepancy is taken up by an adjustable lighting module assembly 24 which performs both lighting and molding functions in a manner to be subsequently described. The base portions of all of the linear modules 14, 16, 18, 20, 22 i.e., those adapted for placement along a single wall as opposed to the corner module 12, are of common depth to define with a portion of the corner module 12 a perpendicularly related modular front wall. An important feature of a preferred embodiment of the invention resides in the particular corner module construction which permits the end-wise insertion of spaced elongate connectors to positively interconnect the corner module with the adjacent, perpendicularly related, linear modules. This is effected in the embodiment shown in FIGS. 1–3, by utilizing a corner module having major x-y dimensions exceeding the depth of the linear modules and one of whose corners is recessed at 26 to lie flush with each adjacent linear module. This construction results in spacing the adjacent corners of linear modules 14 and 18 while defining a smooth merger of their front surfaces at the inside corner 28 of the corner module recess 26 with the concomitant result of spacing the juncture planes between modules 14 and 18 and corner module 12 along the length of the modular front wall. This permits an elongate connector to be inserted endwise between each of modules 12, 14, and 12, 18 as will be more fully explained in the ensuing description of FIG. 3.

Figure 2:
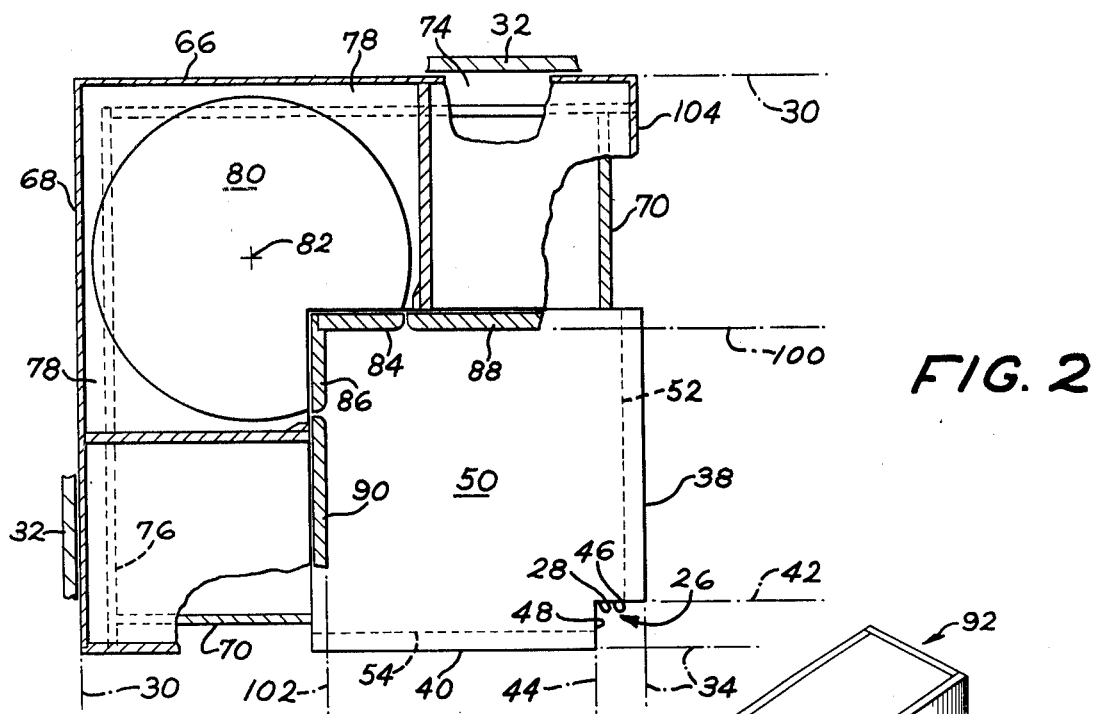
FIG. 2 is a horizontal cross-section of the corner unit shown in FIG. 1 taken along line 2—2 thereof.

The linear modules 14, 16, 18, 20, 22 are desirably of different widths and preferably are different multiples of a predetermined unit of length such as 1 foot, for example. In prototypes built in accordance with the invention, the storage module has been made in two versions one 2 feet wide and one 3 feet wide, the sink and dishwasher modules were combined as a single module 5 feet wide and the refrigerator module 3 feet wide. The corner module was made in three versions, one having a substantially square envelope as depicted in FIGS. 1 and 2; a right handed version of a rectangular envelope and a left handed version of a rectangular envelope. With eight modules, a large number of kitchens may be assembled in various designs to fit rooms of any size.

As previously explained the envelope defined by intersecting vertical planes containing the base portion of corner module 12 has x-y dimensions exceeding the depth of the linear modules although a visual inspection of the assembled modular array would appear to indicate that all modules are of the same depth. The particular relationship of the corner module to the adjacent linear modules as well as the manner in which portions of each module are recessed along their back walls to form a composite raceway for the receipt of plumbing and wiring will become apparent from an inspection of FIG. 2. The vertically standing envelope bounding corner module 12 is defined by the vertical planes 30 lying along the inside of kitchen walls 32 and the intersecting vertical planes 34 which, in the embodiment of FIGS. 1–3, exhibits a square cross-section. The base portion 36 of corner module 12 has mutually perpendicular, non-intersecting side walls 38, 40 adapted to abut the corresponding side walls of adjacent modules 18, 14. The depth of each linear module is equal to the spacing between the mutually perpendicular vertical planes 42, 44 which lie parallel to kitchen walls 32 and vertical planes 30. The corner module recess 26 is defined by mutually perpendicular walls 46, 48 which are respectively coplanar with the front walls of adjacent modules 14, and 18 and thus lie along planes 42, 44 respectively. It will, of course, be apparent that recess 26 could be defined by a single arcuate wall merging with planes 42, 44 rather than the mutually perpendicular walls 46, 48 merging the planes at corner 28. A highly important factor is that the planes of abutment between corner module 12 and each of modules 14, 18 are spaced sufficiently to permit the end-wise insertion of a connector along each plane of abutment which are those planes containing the sides 38, 40 of corner module 12. Corner base portion 36 includes an upper horizontal wall 50 which is coplanar with the corresponding components of the remaining modules, except for the refrigerator module, and which is rabbeted to interfit with similarly configured upper walls on the adjacent modules. In order to insure a positive interconnection between modules, each is recessed along a side wall thereof adapted to abut an adjacent module. Thus, the corner module is recessed at 52, 54 along mutually perpendicular sides 38, 40 while each of the linear modules are recessed along opposite side walls. Exemplary of the latter is the recess 56 shown along side 58 of storage module 14 in FIGS.

3 and 4. A pair of non-aligned abutments 60 are secured to the various modules in each recess 52, 54, 56 which lie on opposite sides of a plane passing between the abutted side walls of adjacent modules when the same are assembled as in FIG. 4. Following the abutment of adjacent sides, such as the side 40 of corner module 12 and the side 58 of storage module 14 for example, an elongate channel connector 62 is inserted into the composite opening defined by the juxtaposition of recesses 52, 56 (FIG. 4) to embrace the spaced abutment pairs 60 and secure the units together. It will be apparent from FIG. 2 that after the first connector 62 has been inserted into recess 52 and the adjacent recess 56 on storage module 14, a second connector 62 may be inserted into recess 54 lying along side 40 of the corner module to join the same to sink module 18. The remaining linear modules may then be interconnected in a similar manner although a separate connector may not be required for the refrigerator module.

Referring again to FIGS. 1 and 2, corner module 12 also includes an upper cabinet 64 having perpendicular back walls 66, 68 lying in the perpendicular planes 30 defined by the back walls of the remaining modules or by the kitchen walls 32. In conjunction with a pair of spaced support columns 70 and a back panel 72, the back walls 74, 76 of base portion 36 extend upwardly to support upper cabinet 64. Each of the back walls of each modular base portion is recessed along a lower portion thereof to create a raceway 78 extending behind all of the modules except the refrigerator for the receipt of plumbing and wiring connections. An elevational view of the raceway is best seen in FIG. 6 while a plan view of the same appears in FIGS. 2 and 5.

The upper cabinet 64 of corner module 12 may include a lazy susan 80 mounted for rotation about an axis 82 and carrying facers 84, 86 thereon for rotation therewith. Cabinet 64 may also include suitable shelving closed by doors 88, 90 which are moveable to an open position generally parallel to base sides 38, 40, respectively and thus do not project beyond the vertical planes 34 defining the outer envelope of corner module 12.

Storage module 14 also includes an upper cabinet 92 spaced above and supported on the base of module 14 by columns 94, 96 and back panel 98 in substantially the same fashion as described in connection with the corner module. Cabinet 92 fronts along a vertical plane 100 which is the common frontage plane for all of the upper cabinet structures backing on the right hand kitchen wall, as viewed in FIG. 1, as will be apparent from the illustration of plane 100 in FIG. 2. Similarly, the remaining upper cabinets backing on the left hand kitchen wall, except for the cabinet structure mounted atop the refrigerator module, front on a common plane 102. It will be noted that the columns, such as 70, 94, 96, supporting the upper cabinets are spaced inwardly of the base side walls while the cabinet side walls are coplanar with the corresponding base side walls. Exemplary is the showing in FIGS. 1 and 2 wherein one side wall 104 of upper cabinet 64 is coplanar with side wall 40 of base portion 36 and the column 70 is spaced inwardly therefrom to form a generally channel shaped section which, when modules 12 and 14 are abutted, cooperates with a similar channel shaped portion on module 14 to define an opening of rectangular cross-section for the receipt of desired electrical connectors such as electrical outlets, switches or the like. Such an assembly is illustrated in FIG. 6 wherein an escutcheon 106 overlaps two adjacent columns to support one or more electrical distributors 108 supplied by wiring 110 communicating with the electrical network in raceway 78. A front view of a double electrical outlet mounted on an escutcheon 112 between spaced columns 114 appears in FIG. 1.

Figure 6:
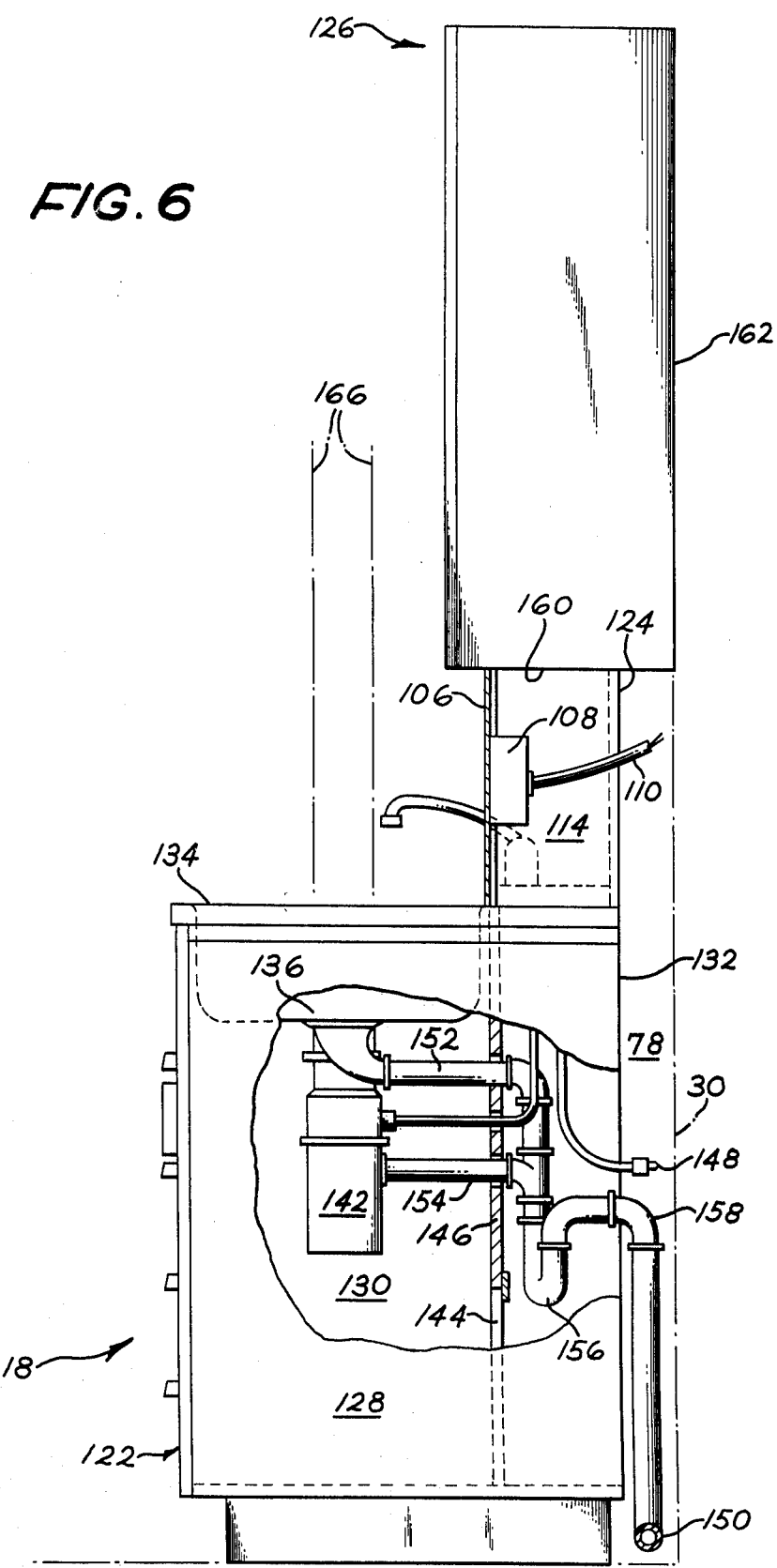
FIG. 6 is an elevation, with parts in section, of a sink module and illustrating an electrical distributor as it would appear when the sink module is abutted against an adjacent module.

It is highly desirable to install the electrical wiring networks, such as exemplified by wiring 110 in FIG. 6, for the receptacles 108 and the like before the various modules are finally positioned against kitchen walls 32. This for the reason that the electrician would require access and egress relative to the back sides of the modules. To this end, the wiring 110 may comprise separable segments looped around the back of each module with the ends projecting through the cavity halves, formed by the inwardly spaced columns, on each side of each module. When the module is moved against a kitchen wall 32, the ends of the wiring 110 are accessible through the receptacle openings formed by adjacent modules. The ends of the wiring 110 may then be connected to the various distributors from the exposed front of the array 10. Alternatively, wiring 110 may comprise a pre-assembled network or harness having the various receptacles, such as 108 in FIG. 6, spaced therealong with sufficient slack in the wiring to allow the receptacles to project through the cavity half defined by the individual module being installed.

It will be apparent that the channel shaped cavity parts for the electrical receptacles provided by each unit are mirror images thereby making the modules symmetrical. This is not mandatory and the cavity parts may extend further into one unit than another as by shifting the columns 70, 94 equally to either side of the position shown in FIG. 3.

Figure 4:
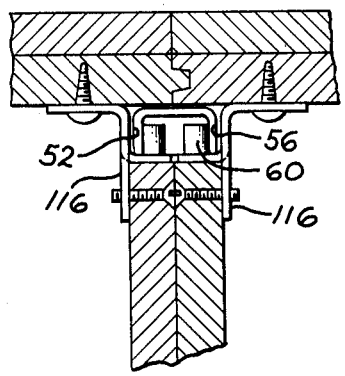
FIG. 4 is a detailed cross-section of the assembled connector structure of FIG. 3.
Figure 3:
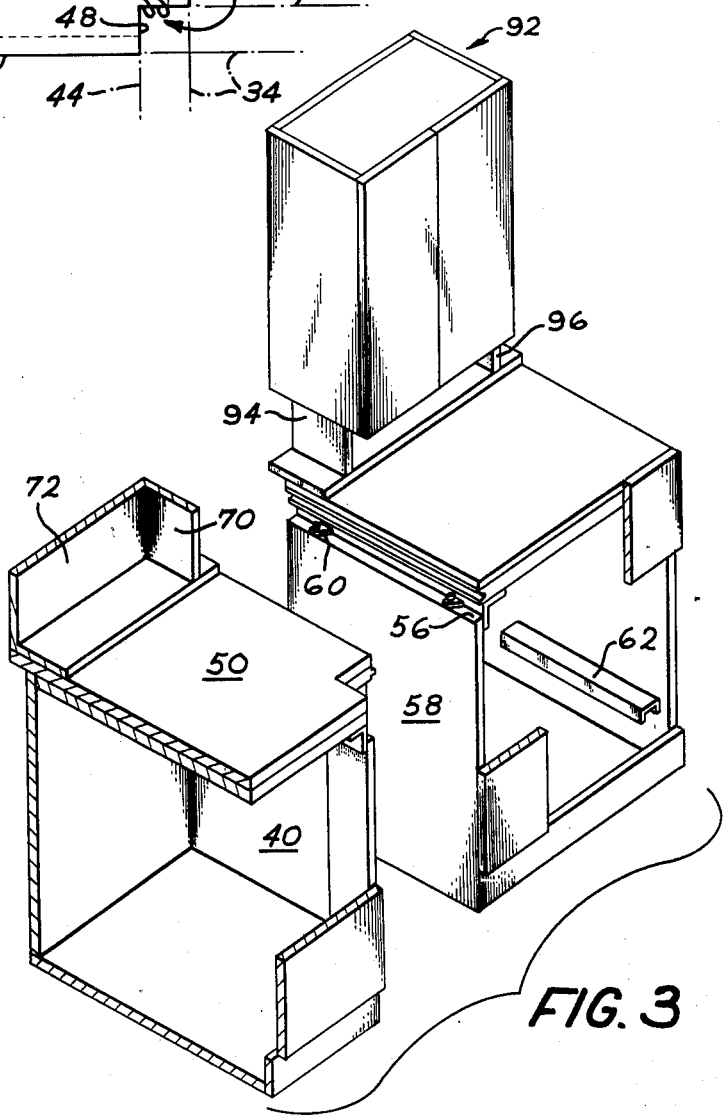
FIG. 3 is an enlarged exploded perspective of the corner and an adjacent unit shown in FIG. 1 illustrating the connector structure.

Although the recesses 52, 56 are illustrated in FIGS. 3 and 4 as being formed as an incident of interconnecting the top and side walls of the base portions by brackets 116 it will be apparent that the recesses could be formed by grooving, for example, the sides of the modular base portions.

Referring now to FIG. 5, there is illustrated a modified corner module 118 which may be substituted for that of FIGS. 1–3 to provide a different modular layout. Corner module 118 differs from that of FIG. 2 in that the vertical envelope 120 defined thereby is generally rectangular rather than generally square. In practice, the corner unit 118 is one unit of width larger than the corner unit 12 in order to accommodate a kitchen design in which the right hand side of the modular array needs to be one increment of width larger to accommodate kitchen walls of different lengths. In some situations, this can be accomplished by using a three-increment wide storage module rather than a two increment wide storage module as represented by module 14. In other situations, the additional increment of width is desirably obtained by the use of the corner unit 118. The corner unit 118 comprises a so-called right handed corner unit since it is wider in the right hand direction than in the left hand direction. It will be equally apparent that a left handed corner unit would be used where the left hand wall requires a greater number of incremental units to "piece out" a full wall coverage.

The sink module 18, illustrated in FIGS. 1 and 6, comprises a lower base portion 122, the usual upstanding columns 114 and back panel 124 supporting an upper cabinet 126 thereabove. The profile of the sink module 18 is substantially the same as that of module 14 and comprises opposed side walls 128, 130, a back wall 132 spaced from the plane 30 and defining therebetween the raceway 78 and a top surface 134 having a sink 136 opening therethrough. Doors 138 and drawers 140, comprising the front of the base portion, front on plane 44 in the usual fashion.

The utilization of the raceway 78 is illustrated where the plumbing connections from sink 136 and disposal 142 pass through a partition 144, having a removable gate 146 therein, to connect with water supply line 148 and drain line 150 positioned in raceway 78. In practice, the water supply line 148 and the drain line 150 are installed prior to the positioning of the modules comprising the array 10. After sink module 18 is moved against wall 32, the gate 146 may be removed providing access to the supply and drain lines 148, 150 so that the necessary connections can be made. The sink module is preferably delivered to the building site equipped with drain connections 152, 154, trap 156 and drain extension 158 so that the only connection made on-site is to connect drain extension 158 to the upstanding part of drain line 150. In similar fashion, module 18 may be equipped with all necessary water supply lines so that only simple connections to the hot and cold water supply lines in raceway 78 are required.

It is of substantial importance that the modular array 10 provide as large a storage area as possible. In the conventional kitchen there is no shelving or cabinetry above the sink since access to the sink would be substantially inhibited if the cabinetry were at a sufficiently low level to provide ready access. In the module 18, the sink 136 and cabinet 126 have been so positioned relative to each other as to provide unobstructed access to the sink and it will be apparent, from FIG. 1, that the cabinetry above the sink constitutes a substantial proportion of the total cabinet space in modular array 10.

The cabinet 126 is substantially the same as the storage module cabinet 92 and includes opposed side walls coplanar with the base side walls 128, 130, a bottom wall 160 which cooperates with columns 114 to form the electrical receiving openings when adjacent modules are abutted and a back wall 162 backing on plane 30. Doors 168 close the front of the cabinet and lie in plane 102. The problem presented by cabinetry above the sink is one of headroom. It is apparent that if the bottom of cabinet 126 were 7 feet above the floor there would be no headroom obstruction for the usual housewife; however, there would also be little storage space and the same would not be readily accessible. It has been determined, empirically, that the maximum required headroom above a sink is that which will permit the housewife to position her head directly above the drain/disposal as in the usual position for placing materials in the disposal or pouring liquids through the sink drain.

Although it may appear from a cursory inspection of FIG. 1 that the planes 100, 102 of the upper cabinets have simply been moved rearwardly to insure that adequate headroom above the sink is available such as by making the cabinets of less than a normal depth; such is not the case as such a design would be self defeating in minimizing overall cabinet capacity. Basically, what has been done is that the lower base portion of each module has been moved forwardly which, concomitantly, creates the raceway 78 and the sink 136 has been mounted at the extreme forward edge of the sink module base portion 122 as is readily apparent from FIG. 6. The trace 166 of the sink drain opening thus lies well forward of plane 102 containing the sink module cabinet doors 168. This construction, while simple in retrospect, is in sharp contrast to conventional arrangements wherein the sink supporting cabinet backs directly on a kitchen wall and the sink, itself, is conventionally placed well rearwardly of the front wall thereof. In order to preclude any possibility of headroom blockage by virtue of a cabinet door 168 being left open, sliding doors may be employed above the sink to close the cabinets which are at such a level as to be readily accessible to the normal housewife.

Referring to FIG. 1, it will be seen that the dishwasher module 20 is illustrated as being separate from the sink module; however, it is normally desirable to construct these units as a single module to facilitate the maximum number of preliminary plumbing connections at the factory. The dishwasher and sink modules may, of course, be reversed in position as desired.

The range module 16 is constructed in accordance with the principles previously discussed and includes a front surface 170 fronting on planes 42 in common with the remainder of the linear units installed along the right hand kitchen wall of FIG. 1. The range is preferably built into its module, which includes the upper cabinets 172 fronting on plane 100, prior to on-site delivery.

The refrigerator module 22 differs in several respects from the remaining modules. Since typical refrigerators are on the order of about six feet high, no surface provided by the module 22 is coplanar with the working surface provided by the remaining modules. Since the refrigerator 174 is usually at one end of a kitchen layout and may be slightly deeper than the remaining modules, it is not essential that the refrigerator front 176 reside in the plane 44, although such is desirable. Other differences between the refrigerator module 22 and the remaining modules will be apparent as the description proceeds.

The module 22 is illustrated as comprising spaced supports 178, on opposite sides of the refrigerator 174, having an upper cabinet 180 thereon. The cabinet 180 preferably fronts in a plane defined by the refrigerator front 176 rather than in the plane 102 to afford easy access thereto. Since the refrigerator 174 is usually at one end of the kitchen layout and acts to break the working surface of a kitchen in any event, this does not present a design disadvantage. The module 22 may be connected to the adjacent module 20 although this is not essential since the module 22 does not provide a counter top which, upon shifting of the modules 20, 22 would be distorted.

Although the refrigerator 176 may be connected to the module 22 if desired, it is convenient to install these components separately at the site. An electrical receptacle may be provided in either of the supports 178 for connecting the refrigerator 176 to the wiring 110 or the refrigerator may be connected separately to a source of power.

Referring to FIG. 7, there is illustrated a cross-section of lighting module 24 for illuminating the room in which the array 10 is placed and providing a molding between the array 10 and ceiling 180 of the room. FIG. 7 comprises a cross-section of the range module 16 which includes the now familiar upper cabinet 172 including a back wall 182 adjacent the kitchen wall 32, the cabinet front 184 parallel to the back wall 182 and a top wall 186 spaced from the ceiling 180.

Lighting module 24 comprises a housing 188 including a lower removable refractor 190 and outwardly facing openings 192 for the transmission of light from fluorescent tubes 194. The outer vertical wall of housing 188 extends upwardly toward and terminates below ceiling 180 to define a gap 196 therebetween. Inasmuch as dwellings are not built to precise tolerances, the distances between the floor and ceiling will vary from site to site and since the free standing modules and the light module are of predetermined heights, the dimensions of gap 196 will vary at different construction sites. In order to provide a molding between the array 10, which is of predetermined height, and the ceiling 180, which will be of variable height, lighting module 24 includes an adjustable panel 198 to close off the gap 196 by manipulation of adjustable fasteners 200 received within appropriate slots in panel 198.

In the particular kitchen layout of FIG. 1, the near side of range module 16 may be covered by a planar panel 202, if desired. The panel 202 is illustrated as being exposed to exemplify an arrangement wherein the modular array does not completely piece out or cover the right hand kitchen wall 32 but may fail to extend completely to the next intersecting kitchen wall by a distancne of something less than the aforementioned unit widths. Since it is desirable to cover any unsightly assembly structure and the unfinished kitchen wall, a frangible finishing panel 204 (FIG. 8) of common height with the various modules is cut or broken at a desired distance along one of sides 206, 208 to fill in the gap between the modular array and an intersecting kitchen wall. In the single case of the refrigerator module being spaced from an intersecting wall, since the upper cabinetry fronts on plane 44, it will be unnecessary to cut finishing panel 204 along its length. In the case of all other end modules, such as the range module, it will be necessary to cut panel 204 along its length to create a flush front finish along both of planes 100 and 42 as well as along the plane defined by the front edge surfaces of the upper cabinet supporting columns. The appropriately cut panel 204 may then be secured to the next adjacent module as by the insertion of a suitable fastener through an adjacent side wall to complete the kitchen assembly.

I claim:

1. A modular furnishing assembly comprising a corner module and at least two additional modules laterally and transversely connected adjacent thereto, respectively, each of said modules being free-standing and having: (1) a base cabinet portion including parallel side walls and a counter top; (2) storage means having a top, a bottom, side walls coplanar with the side walls of said base cabinet, and doors providing access thereto, said storage means being integral with said base cabinet portion through column means and panel structure so that no portion of the kitchen wall behind a module is exposed, said integral column means providing support independently for each module and said storage means further being located above and rearwardly offset from said base portion to define a raceway extending upwardly substantially above the counter top of said base cabinet portion to provide for electrical wiring and plumbing is to be installed behind said module, said rearward offset also providing that said doors of said storage means do not swing outwardly beyond the front plane of said module, said module being further characterized by at least one of said column means being spaced inwardly from the common plane of the side walls of the adjacent storage means and base cabinet portion, thereby defining, in conjunction with said counter top of said base portion and said bottom of said storage means, an inset bounded on three sides only and opening on the fourth side for cooperation with a like inset of any adjacent module in abutting association therewith to provide a tunnel for receiving electrical distribution means; connector means for connecting adjacent modules together along abutting side walls thereof, said connector means being accessible from the front of said units; and lighting means located above the top of and attached to said storage means for illuminating the surroundings and providing a molding between said storage means and the ceiling when the module is installed in the room.

* * * * *